United States Patent
Sekine

(10) Patent No.: US 7,907,147 B2
(45) Date of Patent: Mar. 15, 2011

(54) TEXTURE FILTERING APPARATUS, TEXTURE MAPPING APPARATUS, AND METHOD AND PROGRAM THEREFOR

(75) Inventor: Masahiro Sekine, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 777 days.

(21) Appl. No.: 11/857,870

(22) Filed: Sep. 19, 2007

(65) Prior Publication Data

US 2008/0074435 A1 Mar. 27, 2008

(30) Foreign Application Priority Data

Sep. 25, 2006 (JP) .................................. 2006-259348

(51) Int. Cl.
*G06T 17/00* (2006.01)
*G09G 5/00* (2006.01)
*G06K 9/00* (2006.01)
*G06K 9/40* (2006.01)
*G06K 9/32* (2006.01)

(52) U.S. Cl. ........ 345/582; 345/428; 345/606; 345/619; 345/660; 382/253; 382/254; 382/263; 382/300

(58) Field of Classification Search .......... 345/418–420, 345/428, 581–582, 586–587, 606, 616, 619, 345/660, 668, 501; 382/232, 237, 251–253, 382/254, 260, 263, 274, 276, 285, 293, 298, 382/300

See application file for complete search history.

(56) References Cited

U.S. PATENT DOCUMENTS

| | | | |
|---|---|---|---|
| 6,285,373 B1 * | 9/2001 | Baldwin et al. | 345/582 |
| 6,392,655 B1 * | 5/2002 | Migdal et al. | 345/582 |
| 7,129,954 B2 | 10/2006 | Sekine et al. | |
| 7,256,792 B1 * | 8/2007 | Donovan et al. | 345/582 |
| 2004/0196294 A1 * | 10/2004 | hong et al. | 345/582 |
| 2004/0212625 A1 * | 10/2004 | Sekine et al. | 345/582 |
| 2006/0017741 A1 | 1/2006 | Sekine et al. | |
| 2006/0114262 A1 | 6/2006 | Sekine et al. | |
| 2007/0008333 A1 * | 1/2007 | Xu | 345/582 |
| 2007/0018994 A1 | 1/2007 | Sekine | |

FOREIGN PATENT DOCUMENTS

| | | |
|---|---|---|
| JP | 2002-358537 | 12/2002 |
| JP | 2004-272580 | 9/2004 |
| JP | 2006-146326 | 6/2006 |

OTHER PUBLICATIONS

U.S. Appl. No. 11/687,745, filed Mar. 19, 2007, Masahiro Sekine, et al.

(Continued)

*Primary Examiner* — Wesner Sajous
(74) *Attorney, Agent, or Firm* — Oblon, Spivak, McClelland, Maier & Neustadt, L.L.P.

(57) ABSTRACT

A texture filtering apparatus includes a first generating unit configured to generate first texture data having a size designated by a user or satisfying a condition designated by the user by using not less than second texture data acquired under different conditions or generated under different conditions, a second generating unit configured to generate texture data for filtering used for filtering by using the first texture data, and a filtering unit configured to perform filtering on the first texture data by using a designated filtering condition and the texture data for filtering.

14 Claims, 11 Drawing Sheets

OTHER PUBLICATIONS

Jon P. Ewins, et al., "MIP-Map Level Selection for Texture Mapping", IEEE Transactions on Visualization and Computer Graphics, vol. 4, No. 4, Oct.-Dec. 1998, pp. 317-329.

Yasunobu Yamauchi, et al., "Bidirectional texture mapping and generation for real cloth material", "Generating and mapping of photographed fabric material used bidirectional dependent texture", Visual Computing Graphics and CAD Joint Symposium 2003 preliminary manuscripts, Japan, Institute of Image Electronics Engineers of Japan, Corporation Information Processing Societies, Jun. 19, 2003, 1 cover page and pp. 171 to 176.

* cited by examiner

Single texture generation    Multiple texture generation

Index image    Codebook

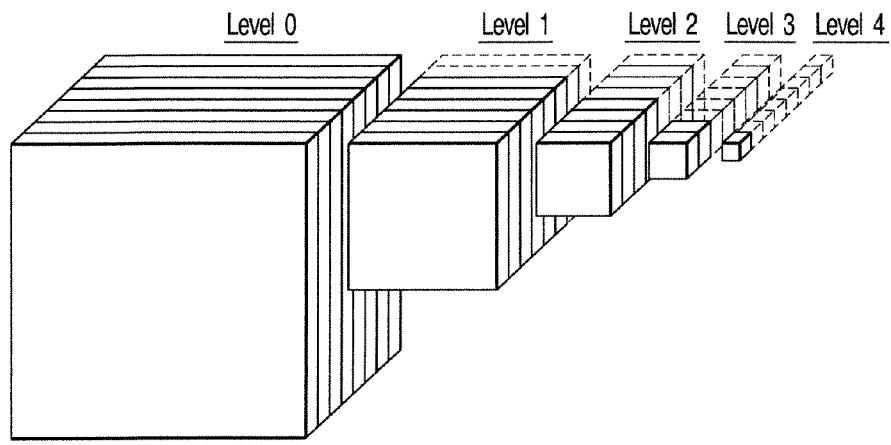
F I G. 1 8
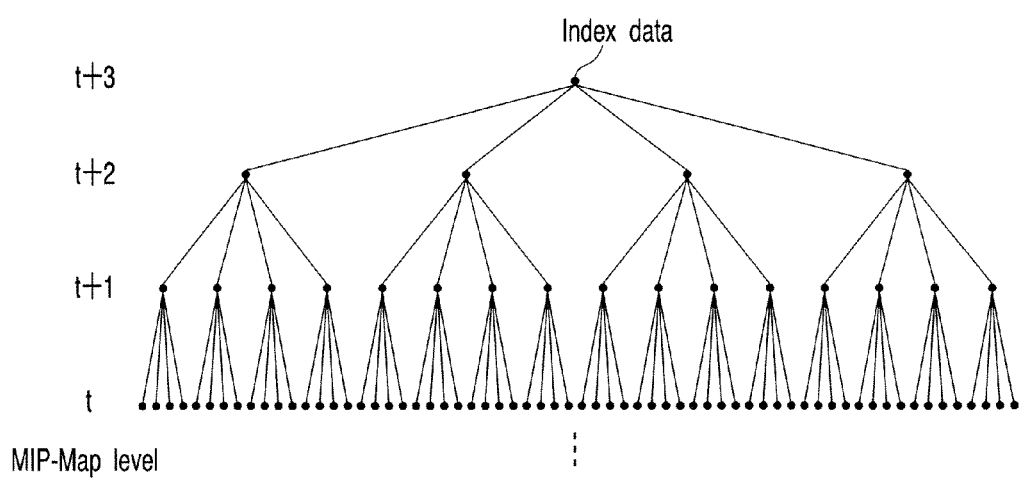
F I G. 1 9

US 7,907,147 B2

TEXTURE FILTERING APPARATUS, TEXTURE MAPPING APPARATUS, AND METHOD AND PROGRAM THEREFOR

CROSS-REFERENCE TO RELATED APPLICATIONS

This application is based upon and claims the benefit of priority from prior Japanese Patent Application No. 2006-259348, filed Sep. 25, 2006, the entire contents of which are incorporated herein by reference.

BACKGROUND OF THE INVENTION

1. Field of the Invention

The present invention relates to a texture filtering apparatus, a texture mapping apparatus, and a method and program therefor which belong to a high-quality texture mapping technique in the three-dimensional computer graphics (CG) field.

2. Description of the Related Art

Recent rapid advances in three-dimensional computer graphics (CG) technology make it possible to implement realistic graphics rendering which looks like a real-life picture. However, many high-quality CG images for movies and TV programs are created by laborious manual work by content creators over an extended period. Such work involves enormous cost. It is likely that a wider variety of CG rendering will be required in the future. There is therefore a need to easily create high-quality CG images at lower cost.

As a technique for realistically rendering the texture of the surface of a CG model, a texture mapping technique is available. This is a technique of pasting a real-life image or an image drawn by a creator on the surface of a CG model on the basis of the texture coordinates assigned to CG data. This technique is widely used for CG creation.

If, however, texture mapping processing is simply applied to CG models which are placed at various positions in a three-dimensional space and have various shapes, some resultant CG model may have a mosaic pattern which causes a sense of oddness. This is because one pixel of a CG drawn frame does not always correspond one-to-one to a single pixel (also called a texel) of a texture depending on the depth of a CG model, its gradient with respect to a viewpoint, and the like. For this reason, there has been developed a technique of performing mapping upon performing texture filtering in accordance with the depth of a CG model, its gradient with respect to a viewpoint, and the like.

As typical texture filtering methods, bilinear filtering, trilinear filtering, anisotropic filtering, and the like are available. Bilinear filtering is a technique of determining a final pixel value (color) by extracting four neighboring pixels on the basis of texture coordinates designated by a decimal number and performing linear interpolation. Trilinear filtering is a technique of determining a final pixel value (color) by extracting eight proper pixels using a so-called MIP-Map texture and performing linear interpolation. In this case, a MIP-Map texture is a set of textures obtained by multiplying a texture to be mapped by ¼ stepwise. The respective textures are sequentially called "a texture at MIP-Map level 0, a texture at MIP-Map level 1, a texture at MIP-Map level 2, . . . ". According to trilinear filtering, a texture to be used for mapping is changed in accordance with the depth of a CG model. If, for example, textures at MIP-Map levels 0 and 1 are to be used, bilinear filtering is performed by using each texture. In addition, linear interpolation is performed between the textures at the two levels. Anisotropic filtering is a technique of calculating a quadrilateral in a texture to be mapped to a pixel of a CG model in accordance with the gradient of the CG model with respect to a viewpoint, and performing linear interpolation by performing bilinear filtering or trilinear filtering at a plurality of sampling points in the quadrilateral, thereby determining a final pixel value (color). Using the above texture filtering makes it possible to express the surface of a CG model without any sense of oddness even if the CG model is enlarged/reduced or deformed (see, for example, JP-A 2004-272580 (KOKAI) and Jon P. Ewins, Marcus D. Waller, Martin White, and Paul F. Lister, "MIP-Map Level Selection for Texture Mapping", IEEE Transactions on Visualization and Computer Graphics, v.4 n.4, pp. 317-329, October 1998).

There is also available a technique of mapping on the surface of a CG model in a wide range by generating a texture with an arbitrary size from a small sized texture. This is called a texture generating technique. As texture generating algorithms, there are available a method of generating a texture with an arbitrary size by performing pattern matching on a pixel or block basis and a method of expressing a large texture by preparing a plurality of small images with inconspicuous boundaries and randomly arranging them in a tile pattern (see, for example, JP-A 2004-272580 (KOKAI)). A texture generated by such a method is sometimes expressed by simply making each pixel have color information, and is expressed at other times by index images and codebooks (color tables). The latter technique has the merit of reducing the amount of texture data used by storing, in a codebook, color information which is repeatedly used, and expressing an address in the codebook at which color information to be used is stored by using an index.

As high-quality texture expression methods, high-dimensional texture techniques (see, for example, JP-A 2006-146326 (KOKAI)) are available. These techniques use textures captured under different viewpoint conditions or light source conditions and adaptively perform mapping on the basis of viewpoint conditions or light source conditions for a CG model.

The above description is about the background art associated with texture mapping for realistically expressing CG surfaces. It is, however, difficult to perform texture filtering for data obtained by generating a texture or high-dimensional texture. This is because it is impossible to simply generate a MIP-Map or quickly extract a plurality of pixels from texture data expressed by index images and codebooks. It is therefore necessary to develop a filtering method suitable for textures expressed by index images and codebooks and a filtering method specialized for a high-dimensional texture technique.

It is possible to implement texture mapping with a small data size in a wide range by generating one or more textures with arbitrary sizes from one or more textures acquired under different viewpoint conditions or light source conditions. In this case, however, texture filtering cannot be simply performed.

In order to simply perform texture filtering, it is necessary to convert a texture into a general texture data structure instead of an expression using index images and codebooks. This conversion, however, cancels the merit of reducing a data amount by texture generation. There is also available a method of generating a MIP-Map for each tile and painting out only the boundary portions between the tiles in the same color. This method also suffers from a problem in terms of resolution.

BRIEF SUMMARY OF THE INVENTION

In accordance with an aspect of the invention, there is provided a texture filtering apparatus comprising: a first generating unit configured to generate first texture data having a size designated by a user or satisfying a condition designated by the user by using not less than second texture data acquired under different conditions or generated under different conditions; a second generating unit configured to generate texture data for filtering used for filtering by using the first texture data; and a filtering unit configured to perform filtering on the first texture data by using a designated filtering condition and the texture data for filtering.

In accordance with another aspect of the invention, there is provided a texture mapping apparatus comprising: a first generating unit configured to generate first texture data having a size designated by a user or satisfying a condition designated by the user by using not less than second texture data acquired under different conditions or generated under different conditions; a second generating unit configured to generate texture data for filtering used for filtering by using the first texture data; a calculation unit configured to calculate a filtering condition at the time of mapping on a surface of a CG (computer graphics) model on the basis of designated CG model data; a filtering unit configured to perform filtering on the first texture data by using the calculated filtering condition and the texture data for filtering; and a generating unit configured to generate CG data by mapping the texture data having undergone the filtering onto the CG model data.

BRIEF DESCRIPTION OF THE SEVERAL VIEWS OF THE DRAWING

FIG. 18 is a view showing a MIP-Map obtained by changing the number of texture samples in accordance with MIP levels in the third embodiment; and FIG. 19 is a view showing a tree structure expression indicating an index for each pixel in the fourth embodiment.

DETAILED DESCRIPTION OF THE INVENTION

Figure 1:
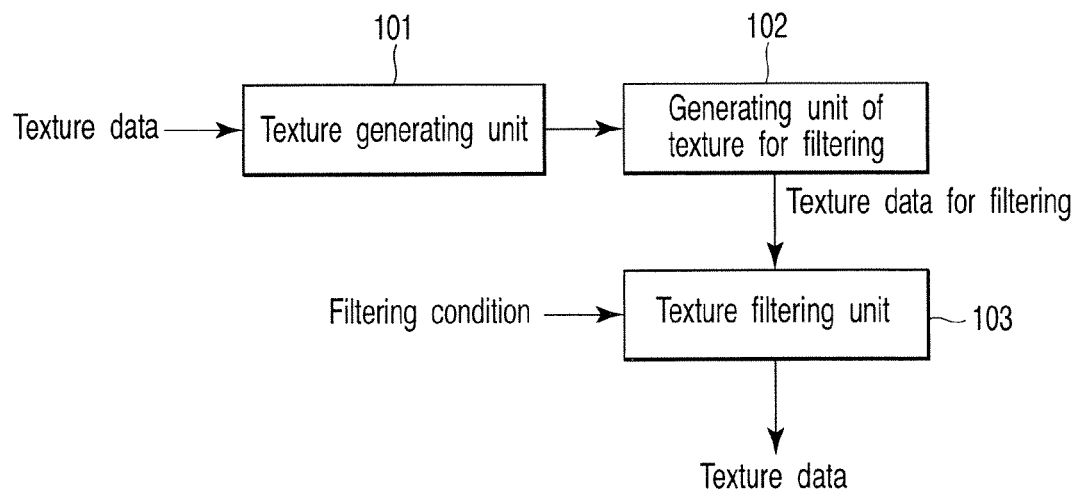
FIG. 1 is a block diagram of a texture filtering apparatus according to an embodiment.

A texture filtering apparatus, a texture mapping apparatus, and a method and program therefor according to embodiments will be described with reference to the views of the accompanying drawing.

A texture filtering apparatus according to this embodiment implements CG rendering without any sense of visual oddness by performing adaptive texture filtering in accordance with the depth of a CG model, its gradient with respect to a viewpoint, and the like. The texture filtering apparatus of this embodiment is an apparatus which can perform effective texture filtering for one or more textures acquired or generated under different conditions upon performing texture generation. The texture filtering apparatus of the embodiment can also be used as a texture mapping apparatus having a filtering function by combining an input means for CG model data, a texture mapping means, and the like.

In addition, the texture filtering apparatus of this embodiment can be expected to be mounted in a next-generation graphics processing engine and can be expected to be applied to computer aided design (CAD) and applications such as various types of simulation engines.

The texture filtering apparatus of this embodiment inputs one or more texture data acquired under various viewpoint conditions, light source conditions, and the like. The apparatus then generates texture data having arbitrary sizes or corresponding to an arbitrary number of samples from the texture data, and expresses them by using index images and codebooks. In order to generate texture data for filtering, the apparatus generates new index images and codebooks. In such a case, optimizing the data structure of index images and codebooks can improve the efficiency of texture filtering.

The texture filtering apparatus, the texture mapping apparatus, and the method and program therefor according to the embodiments can generate texture data having arbitrary sizes or corresponding to an arbitrary number of samples from one or more texture data acquired or generated under different conditions, and can implement high-quality texture mapping with texture filtering.

The first embodiment will exemplify a series of processing operations of a texture filtering apparatus and a texture mapping apparatus having a filtering function. This embodiment will exemplify a MIP-Map generating method as an example of the texture generation for filtering. The embodiment will also exemplify a concrete example of a method of making modified textures of different texture sizes have unique index images and codebooks. In this embodiment, two cases, i.e., a case wherein one texture data is input and a case wherein a multiple texture acquired under different image capturing conditions is input, will be separately described.

The second embodiment will exemplify the processing associated with the operation of sharing a codebook. This embodiment will exemplify a method of generating a codebook common to all modified textures and efficiently expressing a MIP-Map in a case wherein a plurality of modified textures of different sizes like a MIP-Map are prepared. In the embodiment, two cases, i.e., a case wherein one texture data is input and a case wherein a multiple texture acquired under different image capturing conditions is input, will be separately described.

The third embodiment will exemplify the processing associated with the texture generation of modified textures in a case wherein the number of conditions is also changed in accordance with MIP-Map levels. This embodiment will describe a concrete example of a method of generating texture data for filtering and the effects of the method.

The fourth embodiment will explain a method of contriving the data structure of index images. This embodiment will exemplify a method of integrating index images at the respective MIP-Map levels into one index image and expressing the indexes for the respective pixels by using a tree structure, and the processing of providing several types of indexes and changing a processing method in accordance with each type of index.

First Embodiment

The texture filtering apparatus of this embodiment will be described with reference to FIG. 1. This apparatus inputs one or more texture data acquired or generated under different conditions, and outputs texture data which have undergone suitable texture filtering in accordance with filtering conditions. This embodiment proposes an apparatus which can efficiently perform filtering for textures expressed by index images and codebooks and map the resultant textures onto the surface of a CG model.

The texture filtering apparatus shown in FIG. 1 comprises a texture generating unit 101, generating unit of texture for filtering 102, and texture filtering unit 103.

The texture generating unit 101 inputs one or more texture data acquired or generated under different conditions and generates texture data having sizes or satisfying conditions which the user designates by using the input texture data.

The generating unit of texture for filtering 102 generates texture data for filtering to be used for filtering by using the texture data generated by the texture generating unit 101.

The texture filtering unit 103 inputs filtering conditions and performs texture filtering by using the filtering conditions and the texture data for filtering generated by the generating unit of texture for filtering 102. The texture filtering unit 103 outputs the texture data which have undergone the texture filtering.

Figure 2:
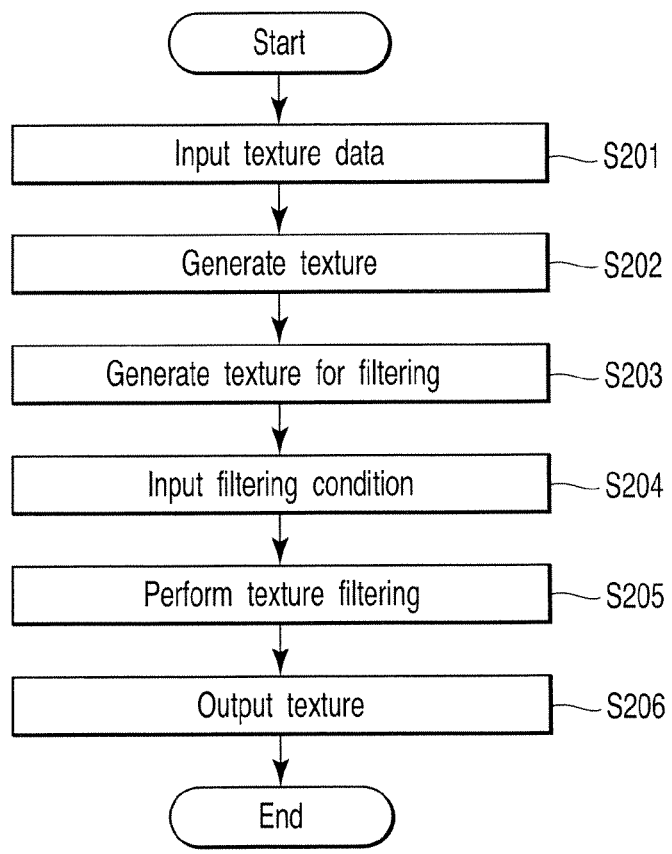
FIG. 2 is a flowchart showing an example of the operation of the texture filtering apparatus in FIG. 1.

An example of the operation of the texture filtering apparatus in FIG. 1 will be described next with reference to FIG. 2.

The texture generating unit 101 inputs texture data (step S201), and generates texture data having sizes or satisfying conditions which the user designates (step S202).

The generating unit of texture for filtering 102 generates texture data for filtering to be used for filtering by using the texture data having the designated sizes or satisfying the designated conditions (step S203).

The texture filtering unit 103 inputs filtering conditions (step S204), and performs texture filtering by using the filtering conditions and the texture data for filtering (step S205). The texture filtering unit 103 outputs the texture data which have undergone texture filtering (step S206). More detailed operation will be described later with reference to FIGS. 7 to 15.

The texture mapping apparatus having the filtering function will be described next with reference to FIG. 3.

Figure 3:
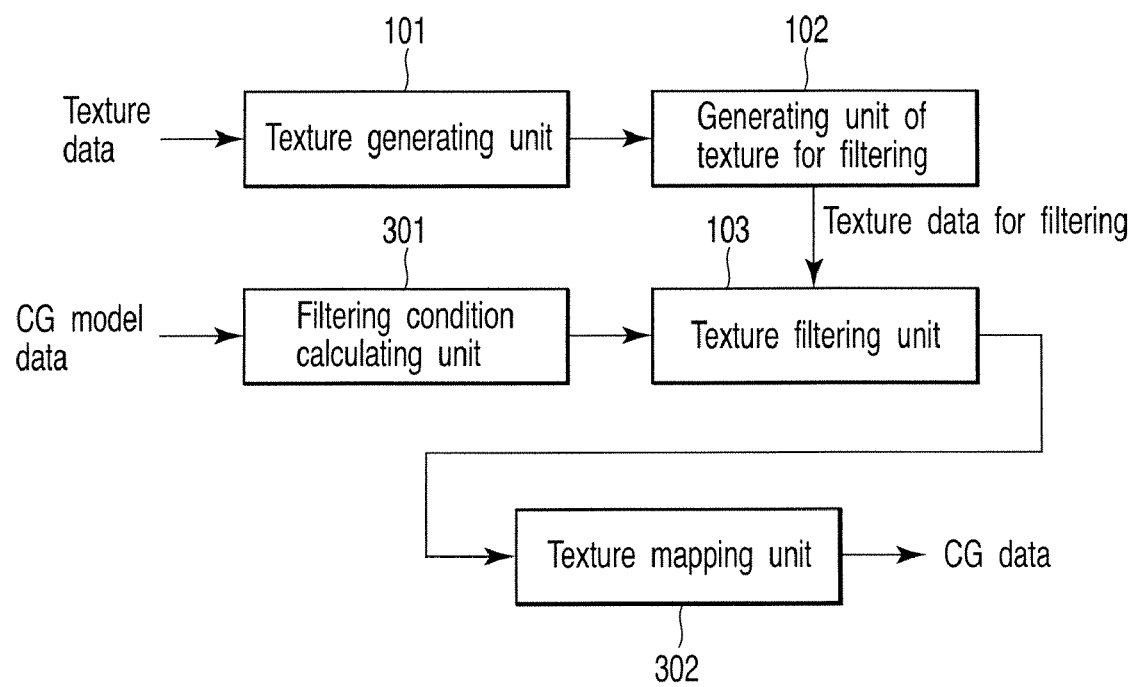
FIG. 3 is a block diagram of a texture mapping apparatus according to the embodiment.

The texture mapping apparatus shown in FIG. 3 comprises the texture generating unit 101, the generating unit of texture for filtering 102, the texture filtering unit 103, a filtering condition calculating unit 301, and a texture mapping unit 302. The same reference numbers as those of the components described above denote the same components, and a repetitive description will be omitted.

The filtering condition calculating unit 301 inputs CG model data, calculates filtering conditions at the time of mapping on the surface of a CG model on the basis of the input CG model data, and outputs the conditions to the texture filtering unit 103.

The texture mapping unit 302 generates CG data by mapping texture data, for which the texture filtering unit 103 has performed texture filtering, onto the input CG model data, and outputs the generated CG data.

Figure 4:
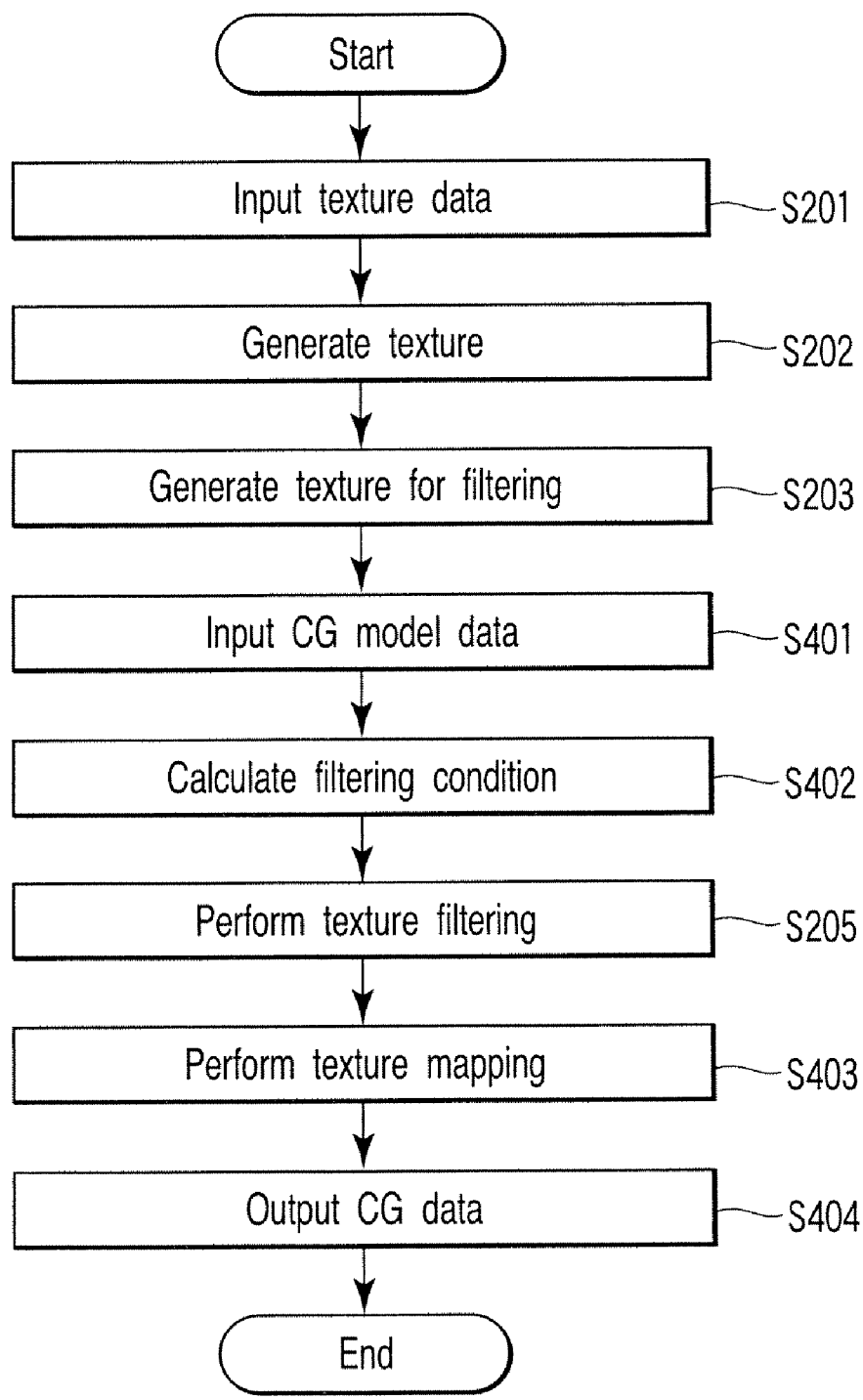
FIG. 4 is a flowchart showing an example of the operation of the texture mapping apparatus in FIG. 3.

An example of the operation of the texture mapping apparatus in FIG. 3 will be described with reference to FIG. 4. The same reference numbers as those of the steps described above denote the same steps, and a repetitive description will be omitted.

The filtering condition calculating unit 301 inputs CG model data (step S401), and calculates filtering conditions (step S402).

The texture mapping unit 302 generates CG data by mapping the texture data, for which the texture filtering unit 103 has performed texture filtering, onto the input CG model data (step S403), and outputs the generated CG data (step S404). More detailed operation will be described later with reference to FIGS. 7 to 15.

A large characteristic feature of the texture filtering apparatus shown in FIG. 1 and the texture mapping apparatus having the filtering function shown in FIG. 3 lies in that they can perform efficient texture filtering for texture data expressed by index images and codebooks.

An example of MIP-Map processing (trilinear filtering) will be described as an example of conventional texture filtering with reference FIGS. 5 and 6.

Figure 5:
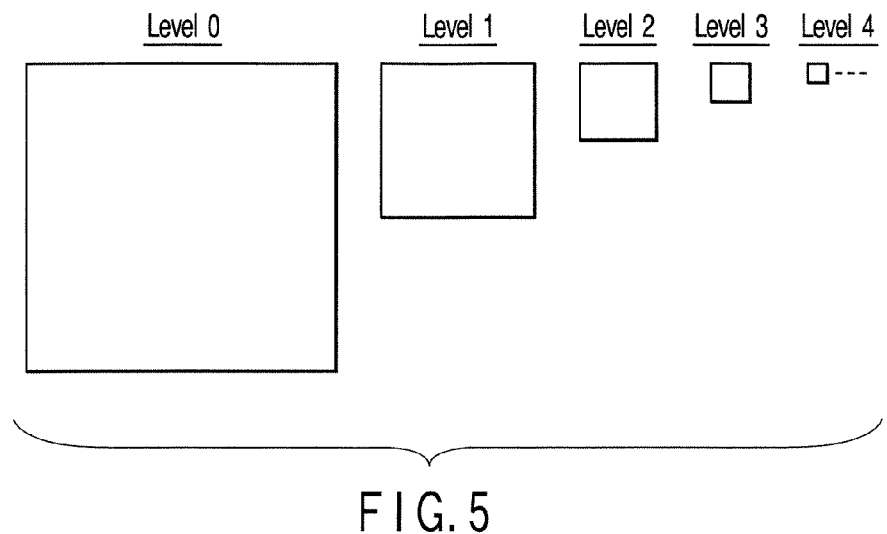
FIG. 5 is a view showing a MIP-Map for a single texture.

A MIP-Map is a plurality of texture data of different texture sizes as shown in FIG. 5. Referring to FIG. 5, levels 0, 1, 2, 3, 4, . . . are so-called MIP-Map levels. Texture data at MIP-Map level 0 is the original texture data. A plurality of texture data of different sizes are generated by multiplying this texture data by ¼ stepwise. It should be noted that the data of each pixel of these texture data contains color information such as RGB information. When reducing texture data, therefore, this apparatus uses a method of determining the pixel value of texture data which is reduced by obtaining, for example, the average value of 2×2 pixels.

Figure 6:
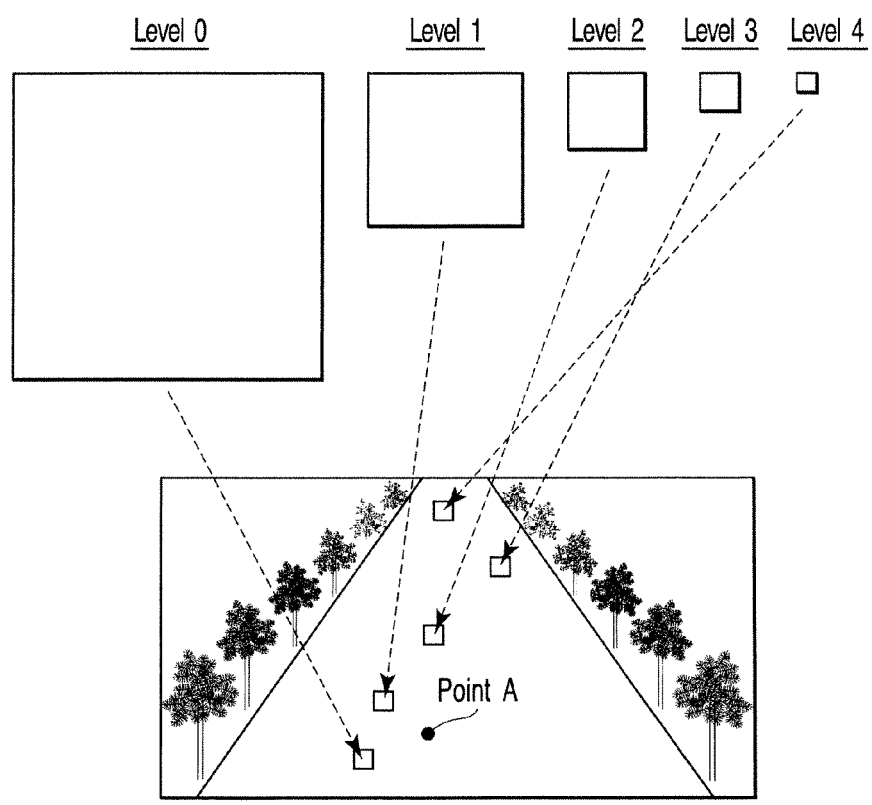
FIG. 6 is a view for explaining texture filtering using the MIP-Map in FIG. 5.

FIG. 6 shows a method of performing texture filtering by using the generated MIP-Map. When texture filtering is performed by using a MIP-Map, the depth of a CG model, for which mapping is to be performed, in a three-dimensional space becomes a filtering condition. In the case shown in FIG. 6, a texture at MIP-Map level 0 is mapped on a front side of the road, and textures at MIP-Map levels 1, 2, 3, 4, . . . are sequentially mapped on the road toward its back side. More specifically, eight pixel data are extracted and linearly interpolated to determine a final pixel value.

When, for example, a texture is to be mapped at a point A in FIG. 6, the apparatus determines to use textures at MIP-Map level 0 and MIP-Map level 1 on the basis of the depth information of the CG model. The apparatus then extracts four pixel data near the texture coordinates designated at the point A from the textures at MIP-Map level 0 and MIP-Map level 1. The apparatus determines a final pixel value by linearly interpolating a total of eight pixel data in accordance with the texture coordinates and the depth of the CG model. A conventional technique implements texture mapping onto a CG model without any sense of oddness by performing such texture filtering.

This embodiment exemplifies a case wherein filtering can be efficiently performed even for texture data after texture generation by using the texture filtering apparatus or the texture mapping apparatus having the filtering function. A method for each processing will be described below along the flowcharts shown in FIGS. 2 and 4 with reference to FIGS. 7 to 15.

When inputting texture data (step S201), the texture filtering apparatus and texture mapping apparatus shown in FIGS. 1 and 3 input one or more texture data acquired or generated under different conditions.

Figure 7:
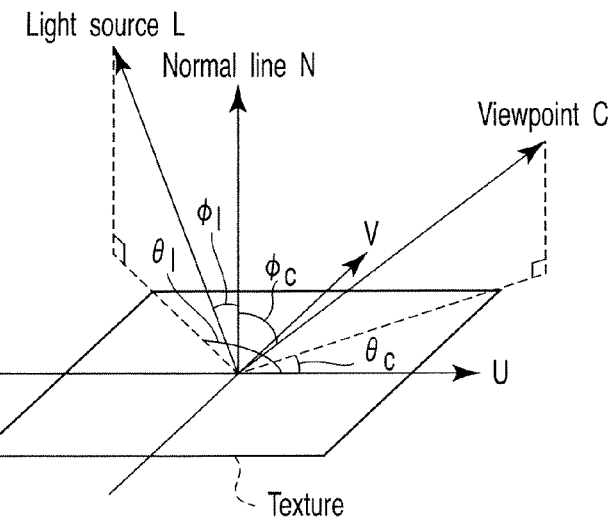
FIG. 7 is a view showing how texture data is acquired by image capturing under different viewpoint position conditions and light source position conditions.

Different conditions include, for example, viewpoint (camera) position conditions, light source (light) position conditions, and the like at the time of image capturing of the texture. FIG. 7 shows an example of image capturing conditions. Tilting or rotating a viewpoint or a light source with respect to a texture will change the manner of how the texture looks. In a space like that shown in FIG. 7, performing image capturing while changing positions $\theta_c$, $\phi_c$, $\theta_1$, and $\phi_1$ of the viewpoint and light source at predetermined intervals makes it possible to obtain a plurality of texture data captured under different conditions. By acquiring a multiple texture in accordance with changes in the distortion or expansion/contraction of a texture surface, a change in the state of a surface texture such as fur, a change in texture over year, changes in various conditions in nature, e.g., a speed, acceleration, pressure, temperature, and humidity, the processing in the embodiment can be used.

Figure 8:
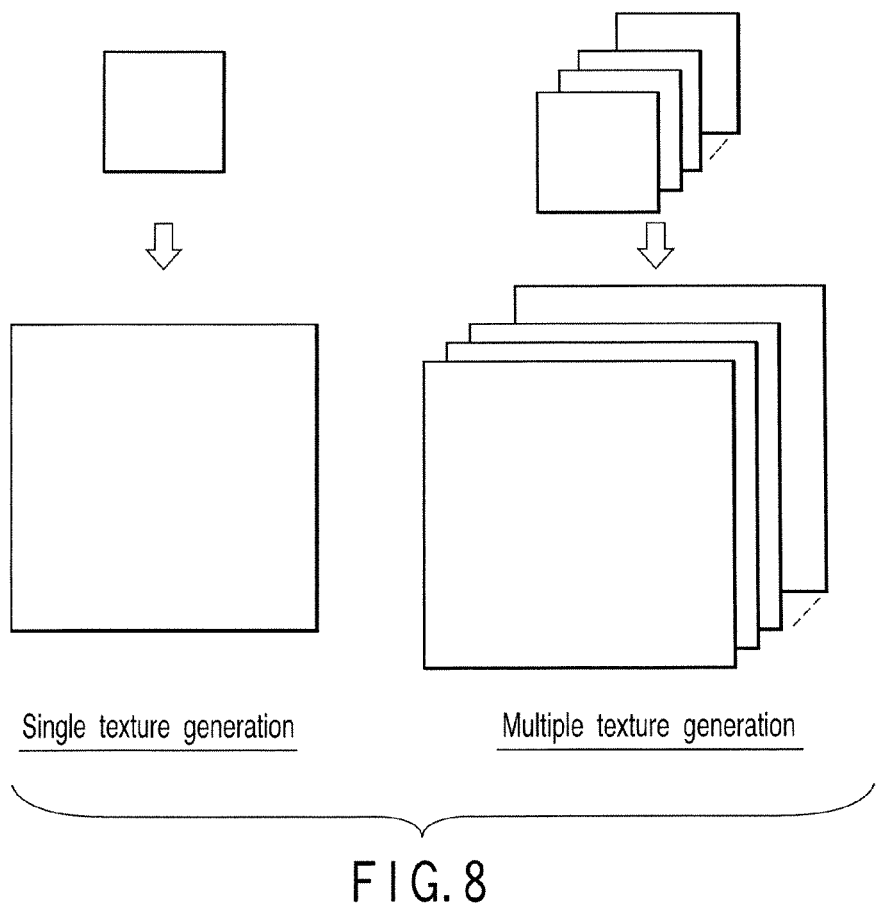
FIG. 8 is a view for explaining the texture generation with an arbitrary size in step S202 in FIG. 2.
Figure 9:
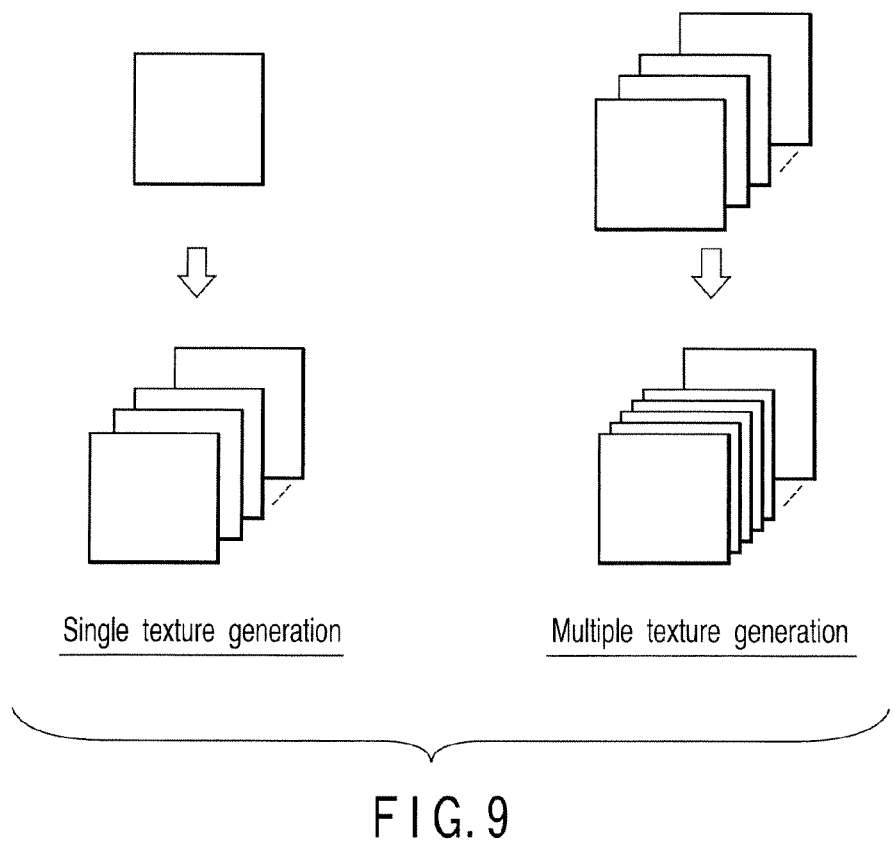
FIG. 9 is a view for explaining the texture generation corresponding to an arbitrary number of samples in step S202 in FIG. 2.

The apparatus then generates textures having arbitrary sizes or corresponding to an arbitrary number of samples from one or more captured texture data (step S202). FIGS. 8 and 9 show a concept of texture generation. FIG. 8 shows how textures having arbitrary sizes are generated from input texture data. Pattern matching on a pixel or block basis makes it possible to generate textures having arbitrary sizes without losing the design or graphic pattern of input texture data, changes in color depending on viewpoint/light source conditions, or the like regardless of whether a single or a multiple texture is input.

FIG. 9 shows how textures corresponding to an arbitrary number of samples are generated from input texture data. If input texture data is a single texture, a texture like that captured under another condition in a pseudo-manner can be generated by changing the luminance or color of the input texture data on the basis of a predetermined criterion. If a multiple texture is input, a texture like that captured under another condition in a pseudo-manner can be generated by interpolating two texture samples. When a texture is generated in this manner, it is conceivable to use a data structure using index images and codebooks as a method of efficiently expressing texture data.

Figure 10:
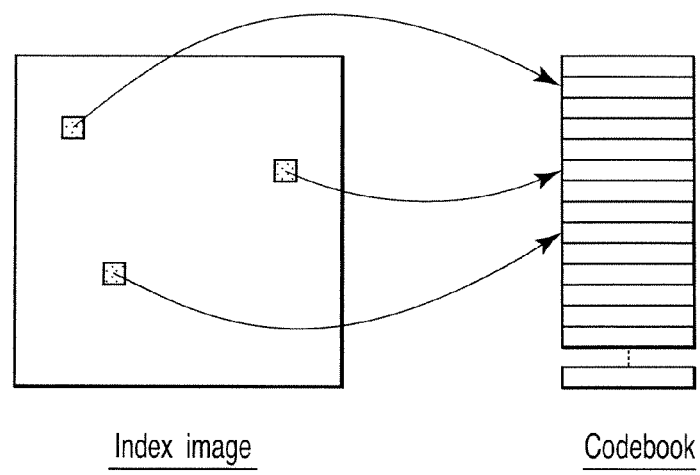
FIG. 10 is a view showing the data structure of a texture with an arbitrary size which is generated from a single texture.
Figure 11:
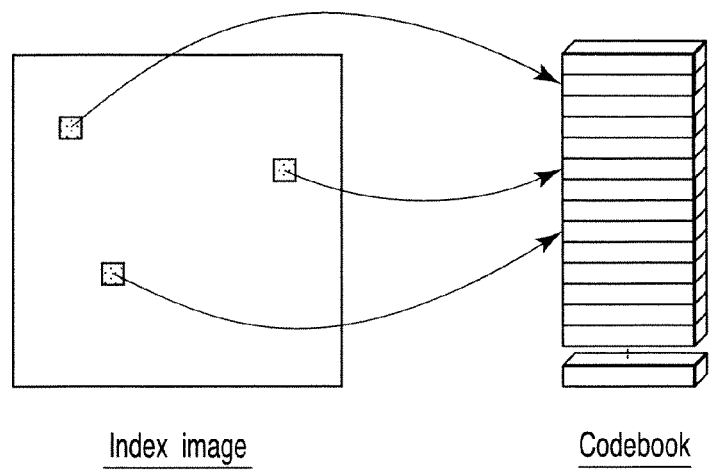
FIG. 11 is a view showing the data structure of a texture with an arbitrary size which is generated from a multiple texture.

FIGS. 10 and 11 each show an example of a data structure using an index image and a codebook. FIG. 10 shows the data structure of a texture having an arbitrary size after it is generated from a single texture. The information of each pixel contains index information indicating an address in a codebook instead of color information as in the prior art. This is called an index image. The codebook contains color information in a table form which is required to express a texture. Referring to FIG. 10, as is obvious, texture data is expressed by referring to one of the colors in the codebook for each pixel.

FIG. 11 shows the data structure of a texture after a multiple texture is generated. This data structure is basically the same as that shown in FIG. 10. In this structure, however, one element of a codebook contains all pieces of color information when conditions are changed, instead of one piece of color information. Obviously, in order to determine final color information, it is necessary to designate conditions as well as texture coordinates (pixel position).

Figure 12:
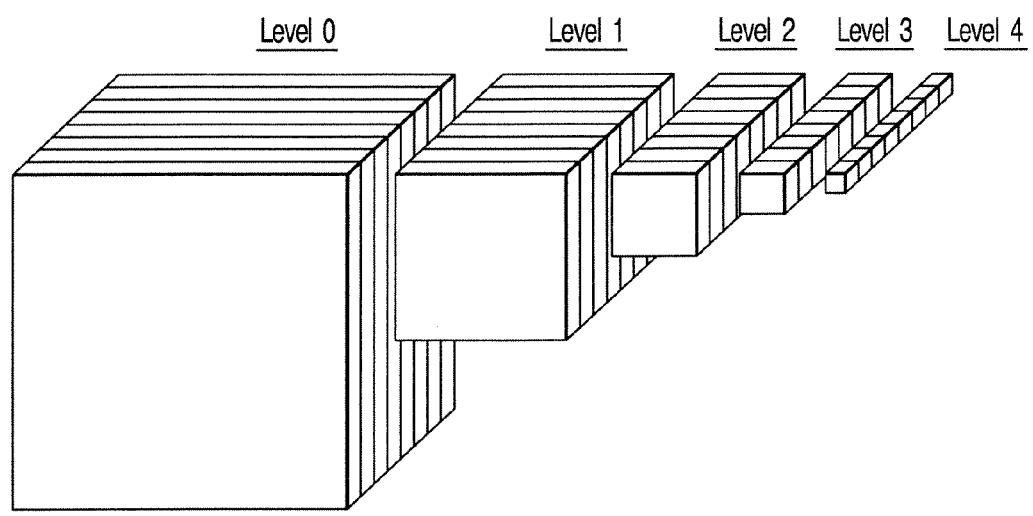
FIG. 12 is a view showing a MIP-Map for a multiple texture.

The apparatus then inputs generated texture data and generates texture data for filtering (step S203). Texture data for filtering is, for example, a MIP-Map which has been described in detail above. If a single texture is input, a MIP-Map like that shown in FIG. 5 is generated. If a multiple texture is input, a MIP-Map like that shown in FIG. 12 is generated. In such a case as well, a texture group at MIP-Map level 0 is the one having the original size, and texture groups at MIP-Map levels 1, 2, 3, 4, ... are obtained by multiplying all the textures by ¼ stepwise. As described above, in this case, since each texture is expressed by an index image and a codebook, a MIP-Map cannot be simply generated.

Figure 13:
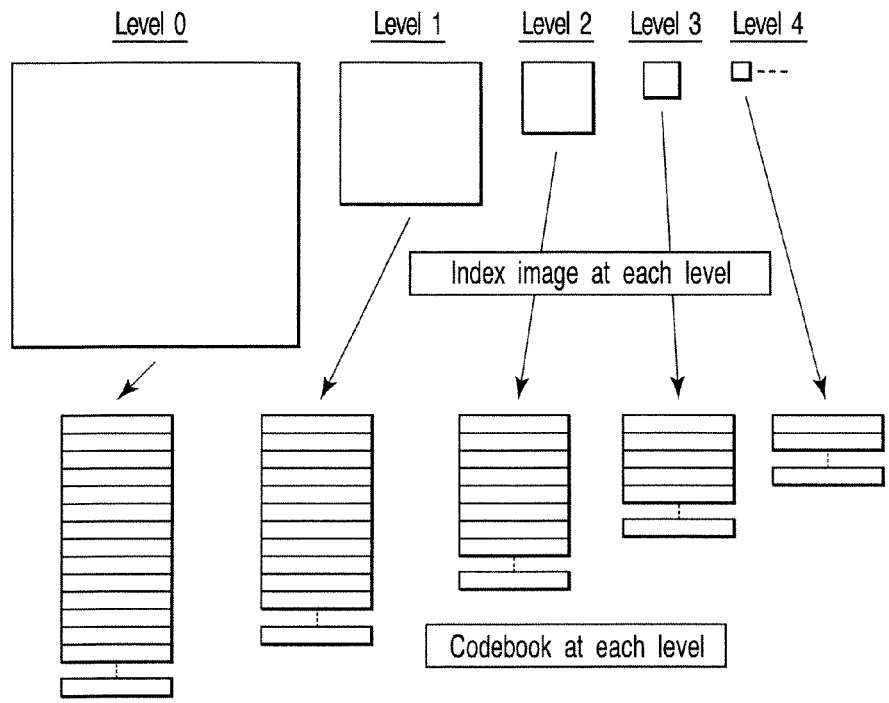
FIG. 13 is a view showing the data structure of a single texture expressed by index images and codebooks.
Figure 14:
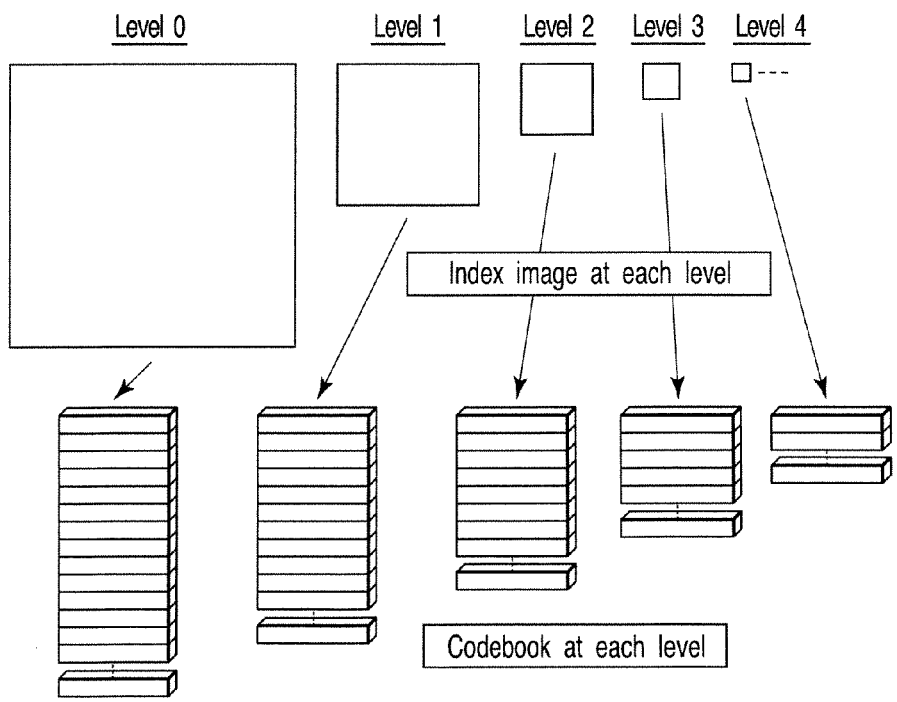
FIG. 14 is a view showing the data structure of a multiple texture expressed by index images and codebooks.

A method of generating a MIP-Map for textures expressed by index images and codebooks will be described. A MIP-Map expressed by index images and codebooks can be generated as a data structure like that shown in FIG. 13 or 14. FIG. 13 shows a case wherein a single texture is used. FIG. 14 shows a case wherein a multiple texture is used. In either case, the MIP-Map has a data structure having index images and codebooks at the respective MIP-Map levels.

Figure 15:
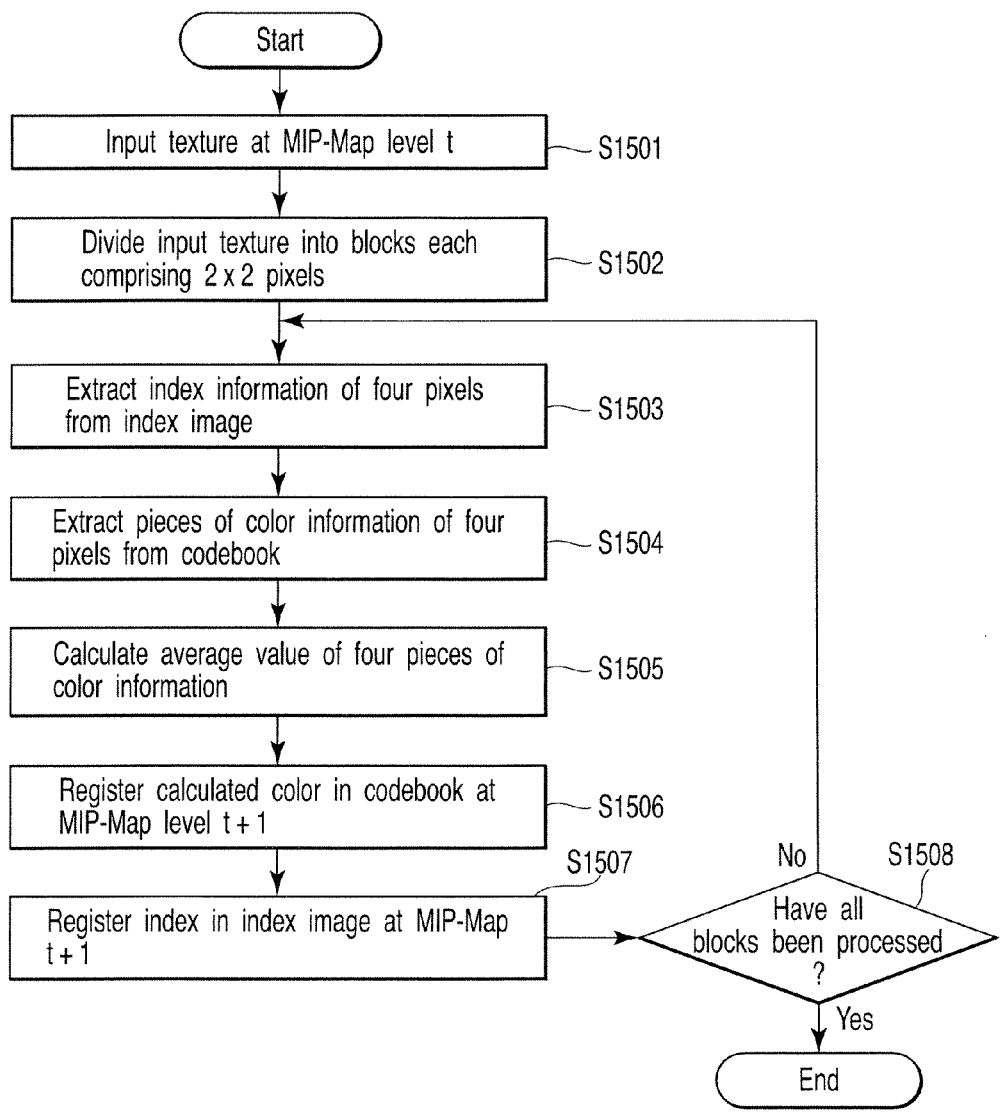
FIG. 15 is a flowchart showing an example of the operation of generating a MIP-Map.

FIG. 15 shows an algorithm for generating such a MIP-Map. This is a flowchart for generating data at MIP-Map level t+1 from data at MIP-Map level t.

First of all, the apparatus inputs texture data at MIP-Map level t (step S1501), and divides the input texture into blocks each having a size of 2×2 pixels (step S1502). The index information of four pixels contained in one of the divided blocks is extracted from an index image (step S1503). The apparatus then extracts the color information of each of the four pixels from the codebook on the basis of the corresponding index information (step S1504), and calculates the average value of the four pieces of extracted color information (step S1505). The apparatus registers the calculated color (average value) in the codebook at MIP-Map level t+1 (step S1506), and registers index information indicating an address in the codebook at which the calculated color is registered at a position corresponding to the index image at MIP-Map level t+1 (step S1507). The apparatus performs the processing in steps S1503 to S1507 for all the blocks (step S1508). This makes it possible to generate texture data at MIP-Map level t+1. Performing such processing with respect to each MIP-Map level can generate a MIP-Map comprising data at many levels.

Subsequently, filtering conditions are derived. The texture filtering apparatus shown in FIG. 1 directly and externally inputs filtering conditions (step S204). A description of specific filtering conditions to be input will be omitted because they are the same as those in the texture mapping apparatus to be described next.

First of all, the texture mapping apparatus having the filtering function shown in FIG. 3 inputs CG model data (step S401). Assume that the CG model data declares vertex data for generating a polygon, and each vertex data contains U and V vectors in addition to position coordinates in a three-dimensional space, texture coordinates, and a normal vector. Assume that the U and V vectors are vectors which indicate in which direction the texture is mapped with respect to the vertex, and are respectively a vector indicating the horizontal axis (U axis) direction of the texture, and a vector indicating the vertical axis (V axis) direction of the texture. When a single texture is to be mapped, these vectors are not always required. The apparatus then calculates filtering conditions by using the input CG model data (step S402). In this case, the apparatus obtains conditions for determining a specific MIP- Map level, specific pixel data at a specific position of a specific texture which are used to calculate final color information. A MIP-Map level selection method determines a MIP-Map level on the basis of the position coordinates of vertex data depending on the position of the CG model in the depth direction.

When a MIP-Map level is determined, a texture is then selected. If there is a single texture, this texture is selected. If there is a multiple texture, it is necessary to indicate specific conditions under which one of the textures should be selected. If, therefore, there are texture data captured under different viewpoint/light source conditions, optimal image capturing conditions are determined depending on how much a vector connecting the viewpoint (camera) or light source (light) and a vertex (a viewpoint vector or a light source vector) is inclined with respect to a normal vector and how much the viewpoint vector or the light source vector is rotated with respect to the U vector or the V vector when the viewpoint vector or the light source vector is orthogonally projected on a plane perpendicular to the normal line. In this manner, a texture is determined. Finally, the apparatus determines, on the basis of the texture coordinates contained in the vertex data, which pixel data at which position in the selected texture is to be used. These conditions are filtering conditions.

The apparatus then inputs the texture data for filtering and the filtering conditions and performs texture filtering (step S205). As described above, it is possible to derive final color information by selecting a MIP-Map level, texture, and texture position on the basis of the filtering conditions. In this case, the apparatus performs processing for deriving such final color information. A case of a single texture will be described first as a concrete example. Assume that the filtering conditions are the MIP-Map levels to be selected are 1.4, and the texture coordinates should be (0.25, 0.75). Obviously, it suffices to select levels 1 and 2 as MIP-Map levels and linearly interpolate pixel data derived from the respective textures at a ratio of 6:4.

Assume that with regard to the textures at the respective levels, the texture size at level 1 is 256×256 pixels, and the texture size at level 2 is 128×128 pixels. In this case, it suffices to extract the portion defined by a horizontal coordinate (U coordinate) of 63.75 (=0.25×255) and a vertical coordinate (V coordinate) of 191.25 (=0.75×255). Extracting and linearly interpolating pieces of color information at four texture positions represented by (u, v)=(63, 191), (63, 192), (64, 191), and (64, 192) can obtain final color information at level 1. Color information at level 2 is obtained in the same manner.

In this case, texture data is expressed by an index image and a codebook. Therefore, when extracting color information at each texture position, the apparatus performs processing in two steps, i.e., extracting an index and extracting an element of the codebook which the index indicates. To summarize the above processing, the apparatus blends a total of eight pixel data. If extraction of an index from an index image and extraction of color information from a codebook are regarded as the same texture loading processing, the apparatus performs a total of 16 times of texture loading.

A case of a multiple texture will be described next. Assume that the same filtering conditions and texture coordinates as those in the above case are set. Assume also that as conditions for the selection of a texture, a viewpoint/light source condition is given by $(\theta_c, \phi_c, \theta_1, \phi_1)=(32, 17, 54, 9)$ [deg] in a space like that shown in FIG. 7. In this case, when all texture data are to be sampled at 10° intervals, the apparatus selects texture samples captured under the following respective conditions: $\theta_c=30, 40, \phi_c=10, 20, \theta_1=50, 60, \phi_1=0, 10$. Considering all combinations of texture samples, the apparatus selects a total of 16 texture samples. As in the above case, the apparatus selects levels 1 and 2, selects 16 textures at each level, and extracts pieces of color information at four texture positions from the respective textures. Therefore, the apparatus extracts a total of 128 pixel data and blends them. Since the apparatus further extracts indexes from index images and pieces of color information from codebooks, the apparatus performs a total of 256 times of texture loading. In the above manner, the apparatus can calculate color information on the basis of input filtering conditions.

Finally, the apparatus integrates the pieces of calculated color information into a texture and outputs it (step S206). Alternatively, the apparatus maps the texture on a CG model (step S403), and outputs the resultant data as CG data to the outside (step S404).

As described above, this embodiment can properly perform texture filtering by properly generating a MIP-Map with respect to textures expressed as data using index images and codebooks by texture generating processing. This embodiment can also perform mapping processing for a CG model, and can implement high-quality texture mapping without any sense of oddness with respect to changes in the depth and gradient of the CG model and changes in viewpoint/light source conditions.

Second Embodiment

This embodiment will describe a method of sharing a codebook when generating a texture for filtering in the texture filtering apparatus shown in FIG. 1 and the texture mapping apparatus having the filtering function shown in FIG. 3. Since the first embodiment has described the overall flowchart (FIGS. 2 and 4) in these apparatuses, the second embodiment will exemplify only a processing method associated with a characteristic difference between the embodiments.

This embodiment will describe a method of reducing a texture size by sharing a codebook in the processing (step S203) of inputting texture data expressed by index images and codebooks and generating a texture for filtering.

Figure 16:
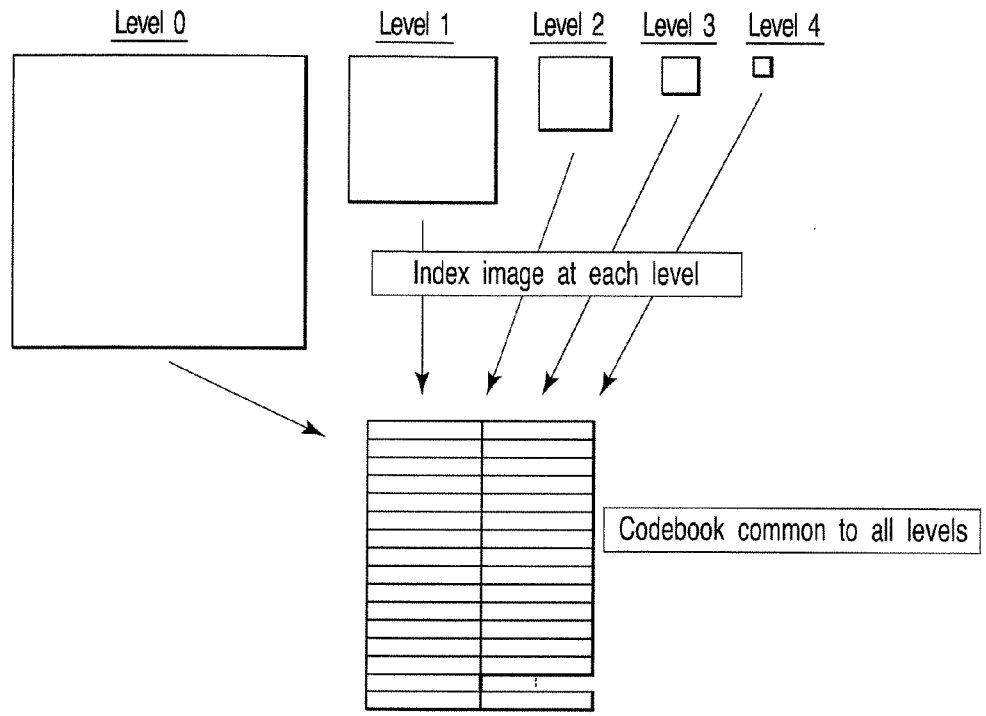
FIG. 16 is a view showing the data structure of a single texture using a shared codebook in the second embodiment.
Figure 17:
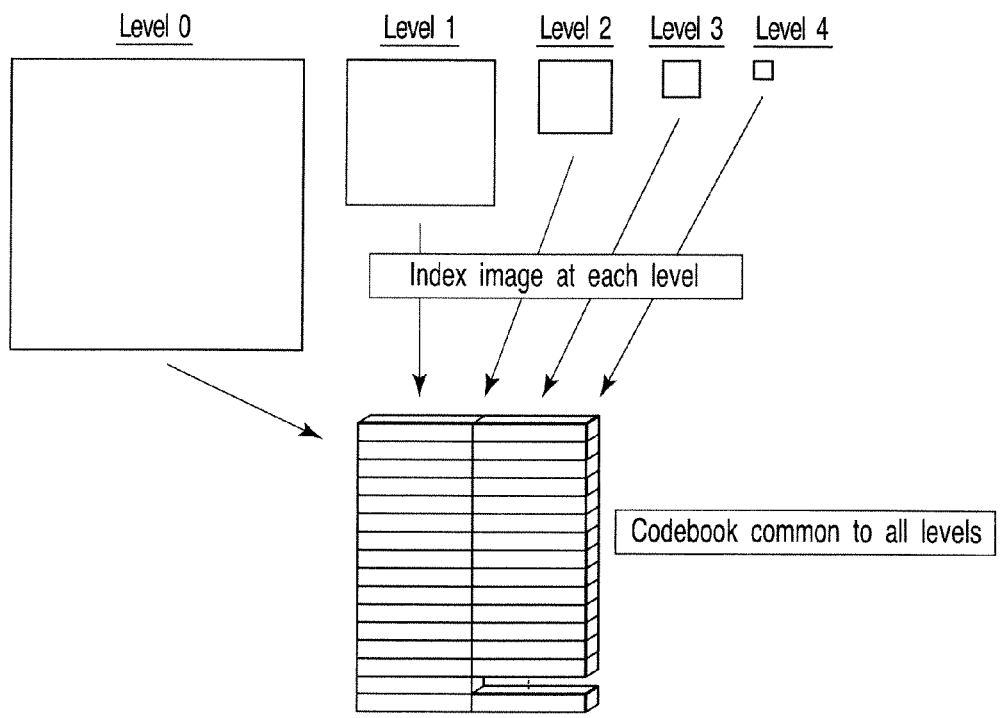
FIG. 17 is a view showing the data structure of a multiple texture using a shared codebook in the second embodiment.

In the first embodiment, when a MIP-Map is to be generated, a unique index image and a codebook are prepared for each MIP-Map level. In contrast, the second embodiment generates a codebook common to all the MIP-Map levels. FIGS. 16 and 17 each show an example of the generation of a MIP-Map with a shared codebook. FIG. 16 shows a case of a single texture. FIG. 17 shows a case of a multiple texture. In either case, the MIP-Map has an index image for each MIP-Map level, and a codebook common to all the levels. An algorithm for generating such a MIP-Map will be described.

First of all, an index image and a codebook are generated at each MIP-Map level by a method like that described in the first embodiment. The codebooks at all the MIP-Map levels are then integrated into one codebook. At the same time when the codebooks are integrated, indexes are re-assigned to update the index images.

In the processing so far, although the codebooks are integrated into one codebook, the overall data amount remains the same. Therefore, the codebook size is reduced by vector quantization. Although the data amount can be reduced by vector quantization in texture generation (step S202) as the preceding processing, this processing is nothing but optimization at a single MIP-Map level (MIP-Map level 0 in step S202). In this case, since this operation is equivalent to performing vector quantization by referring to texture data at all different MIP-Map levels, optimization can be done more efficiently than ever.

When performing vector quantization, it is possible to change weights depending on to which MIP-Map levels the respective vectors (color information in this case) belong. For example, the quality of CG model data can be improved in a case wherein the data is located at the front part (near the camera) by performing the processing of determining a vector contained in texture data at a low MIP-Map level (i.e., a large texture size) strictly with respect to an error while allowing an error to some degree with respect to a vector contained in texture data at a high MIP-Map level (i.e., a small texture size).

As described above, this embodiment can implement a realistic CG expression with a smaller amount of data without any deterioration in quality by sharing a codebook and optimizing the codebook.

Third Embodiment

This embodiment proposes a new MIP-Map in which the number of texture samples (the number of conditions) is changed in accordance with MIP-Map levels in generating a texture for filtering in the texture filtering apparatus shown in FIG. 1 and the texture mapping apparatus having the filtering function shown in FIG. 3, and describes a method of generating such a MIP-Map. Since the overall flowchart (FIGS. 2 and 4) in these apparatuses has been described in the first embodiment, only a processing method associated with a characteristic difference between the first and third embodiments will be described.

This embodiment proposes a method of generating a new MIP-Map in the processing (step S203) of generating a texture for filtering by inputting a plurality of texture data expressed by index images and codebooks. That is, the number of texture samples is changed in accordance with MIP-Map levels. FIG. 18 shows an example of such a new MIP-Map.

Consider texture samples based on different viewpoint/light source conditions like those exemplified above. For example, the number of textures sampled can be changed in accordance with MIP-Map levels such that textures are sampled at 10° intervals at MIP-Map level 0, textures are sampled at 20° intervals at MIP-Map level 1, and textures are sampled at 30° intervals at MIP-Map level 2.

When texture filtering (step S205) is to be performed by using the MIP-Map generated in this manner, since the numbers of texture samples differ in accordance with MIP-Map levels to be selected, some care must be taken for selecting a texture. More specifically, although a texture selection method is determined depending on viewpoint/light source conditions and the like, it is necessary in this case to customize in advance the calculation of a memory address at which a texture to be selected exists for a MIP-Map in this embodiment.

As described above, this embodiment has described the method of generating a new MIP-Map in which the number of texture samples is changed in accordance with MIP-Map levels and the texture filtering method using it. This processing can provide the effect of allowing to finely observe changes due to a viewpoint and a light source if CG model data exists at the front part (near the camera) while allowing to only coarsely observe changes due to a viewpoint and a light source if CG model data exists at the rear portion (far from the camera).

Fourth Embodiment

This embodiment describes a method of implementing and expressing index images at the respective MIP-Map levels as one index image when generating a texture for filtering in the texture filtering apparatus shown in FIG. 1 and the texture mapping apparatus having the filtering function shown in FIG. 3. The overall flowchart (FIGS. 2 and 4) in these apparatuses has been described in the first embodiment, only a processing method associated with a characteristic difference between the first and fourth embodiments will be described.

This embodiment describes that efficient texture filtering (step S205) can be performed by integrating index images at the respective MIP-Map levels into one index image in the processing (step S203) of generating a texture for filtering by inputting texture data expressed by index images and codebooks.

FIG. 19 shows an example of integrating index images at the respective MIP-Map levels into one index image. This example expresses the indexes for the respective pixels in a tree structure. The respective nodes of the tree structure contain the indexes for the respective texture positions at the respective MIP-Map levels. Using such an expression makes it possible to improve the accessibility of pixel data at different MIP-Map levels. Improving the readability of index images at all the MIP-Map levels allows the preparation of several types of indexes and, at the same time, the changing of a codebook expression method to some extent. For example, the following three types of indexes are conceivable:

(1) an index for referring to a codebook unique to a MIP-Map level;

(2) an index for referring to a codebook common to all levels; and (3) an index indicating that data must be generated in ascending order of levels.

The index (1) is the same type of index as that used in the first embodiment. The index (2) is the same type of index as that used in the second embodiment. Using these types of indexes together means that codebooks at the respective MIP-Map levels and a codebook common to all the levels can be used together. Using the indexes (1) and (2) together allows the making of a common codebook contain information about vectors which are similar throughout all levels and make codebooks at the respective levels contain information about vectors unique to the respective levels. If this apparatus cannot have a very large codebook due to the limitation of the memory, an index like the index (3) can be used. This index indicates that the apparatus partly generates pixel data in ascending order of levels in actual filtering instead of generating textures upon reducing all of them in advance like a MIP-Map.

As described above, this embodiment can properly adjust the tradeoff between the limitation of the memory and the processing performance by integrating index images at the respective MIP-Map levels into a tree structure as one index image and diversifying the types of indexes.

According to the embodiments described above, texture data having arbitrary sizes and corresponding to an arbitrary number of samples can be generated from one or more texture data acquired or generated under different conditions. Generating proper texture data for filtering can implement high-quality texture mapping having undergone texture filtering.

Efficient texture filtering can be performed after texture generating processing by using the texture filtering apparatus shown in FIG. 1 and the texture mapping apparatus having the filtering function shown in FIG. 3. A data structure using index images and codebooks is indispensable for implementing efficient data expression after texture generation. The embodiments have therefore exemplified various contrivances such as the method of generating a MIP-Map with respect to texture data expressed by index images and codebooks and the effective use of expressions using index images and codebooks. In addition, the embodiments indicate that similar processing can be performed even for a multiple texture captured under different viewpoint/light source conditions and the like, and the third embodiment has proposed a new MIP-Map expression for a multiple texture.

In addition, the processing in the present invention can be applied to vector data such as color information expressed by another calorimetric system (e.g., the YUV, YCbCr, or Lab calorimetric system), a normal vector component, a depth component, and an illumination effect component as well as color information expressed by the RGB calorimetric system.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A texture filtering apparatus comprising:
a first generating unit configured to generate first texture data having a size designated by a user or satisfying a condition designated by the user by using not less than second texture data acquired under different conditions or generated under different conditions;
a second generating unit configured to generate texture data for filtering used for filtering by using the first texture data; and
a filtering unit configured to perform filtering on the first texture data by using a designated filtering condition and the texture data for filtering,
the first generating unit further including
an input device to input an arbitrary size or an arbitrary condition for a texture to be generated
a texture generation unit to implement texture generation with the arbitrary size by pattern matching or texture generation under the arbitrary condition by linear interpolation,
an expression unit to express the first texture data by using an index image of a plurality of index images and a codebook of a plurality of codebooks,
an optimization unit to optimize the codebook by vector quantization processing if a data size of the first texture data is larger than a threshold value, and
a re-assigning unit to re-assign an index for each pixel of the index image.

2. The apparatus according to claim 1, wherein the second generating unit includes a modified texture generator to generate a plurality of modified textures as textures which have different sizes and are to be used for the filtering by using texture data expressed by the index images and the codebooks, and a blending unit to implement, when generating the modified textures, blending processing between pixels by blending vector data of the codebooks which are indicated by indexes stored in the respective pixels in the index images, and make the index images and the codebooks correspond to the respective modified textures generated by blending between the pixels.

3. The apparatus according to claim 1, wherein the second generating unit includes a modified texture generator to generate a plurality of modified textures as textures which have different sizes and are to be used for the filtering by using texture data expressed by the index images and the codebooks, a blending unit to implement, when generating the modified textures, blending processing between pixels by blending vector data of codebooks which are indicated by indexes stored in the respective pixels in the index images, make a common codebook correspond to all the modified textures generated by blending between the pixels, and make the index images correspond to the respective modified textures, the optimization unit optimizing, when generating the common codebook, the codebooks by the vector quantization processing, and the re-assigning unit re-assigning indexes for the respective pixels to the index images of the respective modified textures.

4. The apparatus according to claim 1, wherein the second generating unit is configured to generate a modified texture with the number of conditions being changed in accordance with a change in a texture size of a MIP Map, as well as the MIP Map containing a plurality of modified textures having different sizes.

5. The apparatus according to claim 1, wherein the second generating unit is configured to integrate the plurality of index images of all modified textures as textures having different sizes into one index image, and express a plurality of indexes for respective pixels in a tree structure.

6. The apparatus according to claim 1, wherein the filtering unit is configured to extract a plurality of modified textures which are textures having different sizes from the texture data for filtering under the designated filtering condition, and generate texture data by blending vector data in the codebooks which are indicated by indexes for pixels used for filtering.

7. A texture mapping apparatus comprising:
a first generating unit configured to generate first texture data having a size designated by a user or satisfying a condition designated by the user by using not less than second texture data acquired under different conditions or generated under different conditions;
a second generating unit configured to generate texture data for filtering used for filtering by using the first texture data;
a calculation unit configured to calculate a filtering condition at the time of mapping on a surface of a CG (computer graphics) model on the basis of designated CG model data;
a filtering unit configured to perform filtering on the first texture data by using the calculated filtering condition and the texture data for filtering; and a generating unit configured to generate CG data by mapping the texture data having undergone the filtering onto the CG model data, the first generating unit further including
- an input device to input an arbitrary or an arbitrary condition for a texture to be generated,
- a texture generation unit to implement texture generation with the arbitrary size by pattern matching or texture generation under the arbitrary condition by linear interpolation,
- an expression unit to express the first texture data by using an index image of a plurality of index images and a codebook of a plurality of codebooks,
- an optimization unit to optimize the codebook by vector quantization processing if a data size of the first texture data is larger than a threshold value, and
- a re-assigning unit to re-assign an index for each pixel of the index image.

8. The apparatus according to claim 7, wherein the second generating unit includes a modified texture generator to generate a plurality of modified textures as textures which have different sizes and are to be used for the filtering by using texture data expressed by the index images and the codebooks, implement, when generating the modified textures, blending processing between pixels by blending vector data of the codebooks which are indicated by indexes stored in the respective pixels in the index images, and make the index images and the codebooks correspond to the respective modified textures generated by blending between the pixels.

9. The apparatus according to claim 7, wherein the second generating unit includes a modified texture generator to generate a plurality of modified textures as textures which have different sizes and are to be used for the filtering by using texture data expressed by the index images and the codebooks, a blending unit to implement, when generating the modified textures, blending processing between pixels by blending vector data of codebooks which are indicated by indexes stored in the respective pixels in the index images, make a common codebook correspond to all the modified textures generated by blending between the pixels, and make the index images correspond to the respective modified textures, the optimization unit optimizing, when generating the common codebook, the codebooks by the vector quantization processing, and the re-assigning unit re-assigning indexes for the respective pixels to the index images of the respective modified textures.

10. The apparatus according to claim 7, wherein the second generating unit is configured to generate a modified texture with the number of conditions being changed in accordance with a change in a texture size of a MIP Map, as well as the MIP Map containing a plurality of modified textures having different sizes.

11. The apparatus according to claim 7, wherein the second generating unit is configured to integrate the plurality of index images of all modified textures as textures having different sizes into one index image, and express a plurality of indexes for the respective pixels in a tree structure.

12. The apparatus according to claim 7, wherein the filtering unit is configured to extract a plurality of modified textures which are textures having different sizes from the texture data for filtering under the designated filtering condition, and generate texture data by blending vector data in the codebooks which are indicated by indexes for pixels used for filtering.

13. A texture filtering method performing using a processing engine, the method comprising:
- generating using the processing engine, first texture data having a size designated by a user or satisfying a condition designated by the user by using not less than second texture data acquired under different conditions or generated under different conditions;
- generating texture data for filtering used for filtering by using the first texture data; and
- performing filtering on the first texture data by using a designated filtering condition and the texture data for filtering, the generating first texture data further including
- inputting an arbitrary size or an arbitrary condition for a texture to be generated,
- implementing texture generation with the arbitrary size by pattern matching or texture generation under the arbitrary condition by linear interpolation,
- expressing the first texture data by using an index image and a codebook,
- optimizing the codebook by vector quantization processing if a data size of the first texture data is larger than a threshold value, and
- re-assigning an index for each pixel of the index image.

14. A non-transitory computer readable storage medium storing instructions of a computer program which when executed by a computer results in performance of steps comprising:
- generating texture data having a size designated by a user or satisfying a condition designated by the user by using not less than second texture data acquired under different conditions or generated under different conditions;
- generating texture data for filtering used for filtering by using the first texture data; and
- performing filtering on the first texture data by using a designated filtering condition and the texture data for filtering, the generating texture data further including
- inputting an arbitrary size or an arbitrary condition for a texture to be generated,
- implementing texture generation with the arbitrary size by pattern matching or texture generation under the arbitrary condition by linear interpolation,
- expressing the first texture data by using an index image and a codebook,
- optimizing the codebook by vector quantization processing if a data size of the first texture data is larger than a threshold value, and
- re-assigning an index for each pixel of the index image.

* * * * *